April 13, 1954     M. UNTERMAN     2,674,900
RELEASE OR DISCONNECT FOR POWER UNITS
Filed Oct. 12, 1949     3 Sheets-Sheet 1

INVENTOR.
Manuel Unterman
BY Charles S. Wilson
ATTORNEY.

April 13, 1954  M. UNTERMAN  2,674,900
RELEASE OR DISCONNECT FOR POWER UNITS
Filed Oct. 12, 1949  3 Sheets-Sheet 3

INVENTOR.
Manuel Unterman
BY Charles S. Wilson
ATTORNEY.

Patented Apr. 13, 1954

2,674,900

UNITED STATES PATENT OFFICE 2,674,900

RELEASE OR DISCONNECT FOR POWER UNITS

Manuel Unterman, Far Rockaway, N. Y., assignor to Republic Aviation Corporation, near Farmingdale, N. Y., a corporation of Delaware Application October 12, 1949, Serial No. 120,913

25 Claims. (Cl. 74—469)

1

This invention relates, generally, to aircraft control systems in which a power unit is employed to normally adjust or operate the movable airfoils or control surfaces and in particular it contemplates means whereby the power unit, at the option of the pilot, may be instantly and entirely freed from any cooperation with, or attachment to, the control system thereby converting the system to the conventional, direct manual operation or adjustment of the movable control surfaces.

On high speed airplanes power units are incorporated in the systems for adjusting the control surfaces to facilitate, and even make possible, the operation thereof. These power units, like all mechanisms, on occasion may and do fail, especially in combat airplanes where even a single bullet can incapacitate the power unit. A failure of the power unit for any reason usually renders the control system inoperative as long as the unit remains in the system; therefore the instant invention proposes the release or disconnection of the power mechanism or unit from the control system if and when it becomes inoperative or functions improperly, or in the event the pilot desires to resort to the conventional manual control of the airplane.

The present invention provides a mechanism or device by which the pilot may release or disengage the power mechanism or unit from the control system in favor of the alternative, direct or conventional manual operation thereof, so that the aircraft is at all times controllable regardless of the condition or operativeness of the power unit.

While this invention is especially designed for use in conjunction with power units associated with the control systems of an aircraft, it can readily be adapted for use as a disconnect whereever it is desired to disengage or release any type of power unit or operative device from an associated system or mechanism to render the latter operable from and by an alternative or substitute means.

With the above and other objects in view, as will be apparent, this invention consists in the construction, combination and arrangement of parts all as hereinafter more fully described, claimed and illustrated in the accompanying drawings, wherein:

With the increase of aircraft speeds control surfaces have become and are constantly becoming more difficult, if not impossible, to operate manually. This condition, commonly known as "frozen" controls, results, at least in part, from the development of pressures on the control surfaces which the pilot can overcome only with great difficulty, if at all. At any rate, regardless of the reason, the control surfaces, as airplanes approach sonic and trans-sonic speeds, have been increasingly more difficult to adjust by the conventional systems manually operated by and from the control lever or stick.

Various mechanisms have heretofore been employed to increase the mechanical advantage of the control lever or stick and thereby increase the effective force delivered to the control system and by it applied to the displacement or adjustment of the movable control surfaces. These prior devices usually were part of the conventional manual control system, and were therefore subject to the limitations imposed by the system, space and the pilot. When the maximum efficiency within their limits was attained by these prior devices and greater power was still needed to adjust the control surfaces, the answer was found in the incorporation of a power unit in the control system.

The power unit is so associated with the control system that it functions to cause the system to adjust the control surfaces in substantially the same manner as it would function if manually operated by the control lever or stick. In the control system and power unit herein disclosed and with which the subject invention primarily is to coact, the movement of the control lever or stick merely regulates and controls the operation of the power unit (here shown as a hydraulic jack or motor) and normally plays no part in the adjustment of the control surfaces. However, it is important to give the pilot the sense or feel of overcoming the resistance to movement by the control surfaces in order to prevent over-control of the airplane. For that purpose the control lever or stick is loaded with a part or percentage of the force developed by the power unit with the result that, while the pilot in manipulating the stick or lever is in fact only regulating a valve for controlling the operation of the power unit, a simulated load is imparted to the lever or stick to be overcome by the pilot in adjusting the control lever to regulate the operation of the power unit as aforesaid. Thus the normal adjustment of the movable control surfaces is accomplished entirely by the power unit and the control lever or stick merely serves to regulate and control the operation of this unit. However, should the power unit fail for any reason, an alternative means of operating the control system for the displacement of the control surfaces from and by the control lever must be found and to that end it is desirable to entirely remove or disconnect the power unit from the system to thereby establish a direct operating connection between the control lever and the control system.

The instant invention resides in a release or disconnect by which the pilot may completely sever the association of the power unit with the control system. Under certain circumstances the power unit may be inoperative and yet function as a part of, or link in, the control system and in that event though the pilot may possibly be able to manually adjust the control surfaces in the conventional manner, it will be with great difficulty because of friction and the return or reflection to the control lever of at least part of the force manually and initially exerted thereon by the pilot. (An example of such circumstances is where the power unit is a hydraulic jack or motor and fluid under pressure is not available for its operation. In that event the piston of the jack may reciprocate idly in the cylinder without effect on the control system or the control surfaces.) Under other circumstances the power unit may not only become wholly inoperative but also become incapable of functioning as a component of the control system and in that event the system including the power unit becomes completely inoperative. (An example of this situation is where the power unit is a hydraulic jack or motor and its piston is so damaged that it cannot move relative to the cylinder. Thus the length of the jack becomes set and fixed and cannot be altered to meet changing conditions in the control system of which it is a part.)

In the two examples above outlined, as well as under other conditions affecting the operation of the control system, it is desirable and ofttimes vital that the power unit and elements of the system immediately coacting therewith be quickly disconnected and isolated from the control system so that the pilot may assume direct manual control of the system for the adjustment of the control surfaces. This, among its other objects, is a primary purpose of this invention, i. e., at the option of the pilot to quickly and easily switch from a normal power operation of the control system to the manual operation thereof, and at the same time eliminate from the system all components not essential to this alternative, manual operation.

Neither the control system per se nor the power unit and its cooperation with the control system forms a part of the present release or disconnect, except as it directly cooperates therewith, or is environment and background thereof. While the subject disconnect or release is particularly suitable for cooperation with the control system illustrated and described herein it is to be understood however that it will be readily adaptable to other power operated control systems and mechanisms and to variations and modifications of the mechanism and system disclosed herein.

Though the control mechanism and system illustrated herein in conjunction with the instant release and disconnect per se forms no part of the present invention, a brief description thereof will be helpful to an understanding of the general function and operation of the release or disconnect. The standard control stick or lever 10 of an aircraft by its transverse oscillation actuates a reciprocating link 11 and thereby rotates a bellcrank 12 about a fixed pivot or axis 13. This pivot or axis 13 is carried by a supporting plate 14 which in turn is fixedly secured to any convenient and adjacent part of the aircraft structure. The ailerons, or any other movable control surfaces of the airplane, are adjusted or displaced from neutral by a reciprocatory push-pull rod 15 in the conventional manner; and therefore in the control system presently under consideration the power unit, here comprising a hydraulic jack or motor 16, is to reciprocate this push-pull rod 15. It is of course possible to employ the control system as well as the subject disconnect or release, in conjunction with power units of other types.

So far as the present invention is concerned the hydraulic jack 16 per se is of standard construction in that it consists of a cylinder 17 having a piston (not shown) mounted for reciprocation therein. At an end of the cylinder 17 a piston rod 18 projects and reciprocates through the cylinder head and its inner end is fixedly secured to the piston. The cylinder head at the opposite end of the cylinder 17 has a cylinder rod 19 concentrically attached thereto in alignment with the piston rod 18 longitudinally of the cylinder. As hydraulic fluid under pressure is fed to the cylinder 17 upon one side or the other of the piston therein, the latter moves in one direction or the other within the cylinder and thereby increases or decreases the distance between the extremities of the rods 18 and 19 to protract (extend) or contract (shrink) the jack 16 as will be hereinafter apparent. The piston rod 18 is restricted so that it is permitted to have only a slight movement in the protraction or contraction of the hydraulic jack 16 as aforesaid to the end that the larger amplitude of movement, during the operation of the jack, is confined to the cylinder rod 19.

Mounted for oscillation on the axis or pivot 13 adjacent the bellcrank lever 12 is an actuating lever 20 pivotally connected adjoining its outer or swinging end to the extremity of the cylinder rod 19 by a transverse pin 21 having at least one of its end portions projecting beyond the limits of the actuating lever 20. Thus, as the jack 16 protracts or contracts, the actuating lever 20 is accordingly oscillated upon the pivot or axis 13. A pivotal connection 22 between the free extremity of this lever 20 and the push-pull rod 15 causes the latter to reciprocate to adjust the movable control surfaces according to the oscillation of the actuating lever.

Since the bellcrank lever 12 is directly controlled by the lever or stick 10 and its coacting link or rod 11 and functions solely to adjust the valve 26 regulating the flow of hydraulic fluid under pressure to and from the cylinder 17 of the hydraulic jack or motor 16, it should be operable before the jack or motor commences its expansion or contraction. To that end the extremity of one arm 24 of the bellcrank lever 12 is pivotally connected to the valve rod 25 of the valve 26, so that as the bellcrank 12 is oscillated on the pivot or axis 13 the valve 26 is adjusted to direct the fluid under pressure to one end or the other of the cylinder 17 and thereby cause the cylinder to protract or contract. This reciprocation of the valve rod 25 and the consequent adjustment of the valve 26 is independent of and prior to any operation of the hydraulic jack 16 and for that purpose the extremity of the arm 24 of the bellcrank is provided with an oversize or slotted opening 27 in which the projecting end portion of the pin 21, connecting the cylinder rod 19 to the actuating lever 20, is received. Thus the bellcrank lever 12 and its arm 24 may be adjusted on the pivot 13 to regulate and position the valve rod 25 and valve 26 without in any manner affecting the movement of the adjacent actuating lever 20. As soon as the valve 26 is adjusted, and only a small movement is required for its adjustment, the jack 16 immediately begins to contract or protract according to the adjustment of said valve, thereby causing the lever 20 to corespondingly oscillate and adjust the movable control surfaces through the medium of the push-pull rod 15. The size of the opening 27 in the arm 24 of the bellcrank lever is such that under normal operating conditions the pin 21 may move freely within the opening without even contacting the wall thereof, or affecting or causing any movement by the bellcrank lever 12. In short, the projecting end portion of the pin 21 may be said to float freely in the opening 27.

Of course, unless either the piston rod 18 or the cylinder rod 19 is "bucked-up" or limited in its reciprocatory movement, the operation of the jack will have no effect upon the actuating lever 20. Therefore, in opposition to the cylinder rod 19, which is connected to the actuating lever 20, the piston rod 18 is connected to a composite lever 28 which acts to "buck-up" or limit the reciprocation of the piston rod 18 of the hydraulic jack or motor 16, and divert most of the power exerted by or the movement in the contraction and protraction of the jack through the cylinder rod 19 to the actuating lever 20. In addition to this, the composite lever 28 also delivers part of the power or force developed by the jack 16 back to the control lever or stick 10 so that the pilot is given a simulated sense of overcoming the resistance to movement by the control surfaces at the control lever 10. To accomplish these purposes the lever 28 is pivoted at one of its extremities on a pivot pin or bolt 29' carried by a bracket 29 fixedly secured to an adjacent part of the aircraft structure. The opposite or free end of the composite lever 28 is provided with a clevis or fork 30 for pivoted connection to one end of a reciprocatory reaction rod 31. At its opposite end the reaction rod 31 is pivotally attached to the axis or pivot 13 and also to the arm 24 of the bellcrank lever 12 by a link 32. As the hydraulic jack or motor 16 contracts or expands, the composite lever 28 has a limited swinging movement about its pivot 29' on the fixed bracket 29 because of a connection, to be described, between it and the piston rod 18. This limited movement of the composite lever 28 is imparted to the reaction rod 31 and by it to the bellcrank lever 12 through the link 32. Thus the movement of the composite lever 28 applies part of the power developed by the hydraulic jack 16 to the control lever or stick 10 through the rod 31, link 32 and bellcrank lever 12, whereby the pilot, in manipulating or merely holding the lever 10, receives the sense or feel of actually overcoming the resistance to movement by the movable control surfaces, notwithstanding that his manipulation of the stick or lever 10, in fact, merely adjusts the valve 26.

The foregoing brief description of the power operated control system is sufficient for a clear understanding of the present release or disconnect, its construction and cooperation with a power unit and associated control system. A more detailed and complete understanding of this particular power operated control system can be obtained from the copending application of Milton C. Bergey, Serial No. 51,548, filed September 28, 1948, and of the valve which regulates and controls the operation of the hydraulic jack or motor can be obtained from the copending application of Manuel Unterman, Serial No. 46,897 filed August 30, 1948.

For the purpose of carrying out the present invention the composite lever 28 consists of two sublevers; one an inner lever 33 and the other an outer lever 34, both of which sublevers are mounted for pivotal movement, either independently, or in unison, about a common pivot, such as the fixed pin or bolt 29' supported by the bracket 29.

The outer sublever 34 comprises a pair of spaced, substantially parallel arms 35 pivoted to the fixed pin or bolt 29' at corresponding ends thereof and having their opposite or swinging ends joined, or integrally united, by a transverse web 36. This web 36 may be secured at its ends to, or be formed integrally with, the extremities of the arms 35 to create a unitary lever structure defining an approximately rectangular space 37 between its arms 35, the bolt or pin 29' and the web 36. On its outer surface the web 36 centrally carries the fork or clevis 30 between the tines of which the end of the reaction rod 31 is pivoted by a bolt or other suitable attaching means 38. It is apparent from the foregoing that the outer sublever 34 must swing about the bolt or pin 29' to operate or reciprocate the reaction rod 31 and that if this sublever 34 cannot swing, or is not swung or oscillated on the pivot pin 29' there will be no reciprocation of the reaction rod 31.

The inner sublever 33 is similar in its construction to the outer sublever 34 and is normally housed within the space 37 between the arms 35 of the outer sublever. This sublever 33 consists of a pair of substantially parallel arms 39 pivoted on the pin or bolt 29' at corresponding ends, each arm 39 being adjacent and generally parallel to one of the arms 35 of the outer sublever 34. At their opposite ends the arms 39 of the sublever 33 are bent toward each other to create a pair of adjacent, parallel and spaced ears 40. The extremity of the piston rod 18 is pivoted between these ears 40 of the inner sublever 33 by a bolt or other attaching means 41. By this arrangement as the hydraulic jack 16 shrinks and extends, as aforesaid, under the control of the valve 26 and the distance between the outer extremities of the cylinder rod 19 and piston rod 18 increases or decreases and as a result thereof, the actuating lever 20 and the inner sublever 33 will tend to move or swing in unison about their respective pivots 13 and 29'.

Thus, if the inner sublever 33 is operatively connected to the outer sublever 34 so that the two combine in the unitary composite lever 28, this operation of the motor or jack 21 will cause the oscillation of the composite lever 28 upon the pivot pin or bolt 29' within the limits established for its movement. In short the composite lever 28 may be said to "buck-up" or resist the operation of the hydraulic jack 16 so that only a portion of the power developed thereby will be transmitted to the composite lever 28 and by it to the reaction rod 31 while the major portion of said power is transmitted by cylinder rod 19 of the jack 16 to the actuating lever 20 and through it to the push-pull rod 15 as above described.

On the other hand if the connection between the inner sublever 33 and the outer sublever 34 is severed or destroyed the composite lever 28 ceases to function as a unit and the inner sublever 33 may idly oscillate on its pivot 29' without in any way affecting the outer sublever 34 and the reaction rod 31 and the jack 16, even if operating, would not in that event cause movement of the actuating lever 20. In other words when the sublevers 33 and 34 are connected one to the other to create or establish the unitary composite lever 28 they oscillate in unison about their common pivot 29' upon the operation of the hydraulic jack 16 to cause the required reciprocation of the reaction rod 31 and by their limited movement cause the jack 16 to oscillate the actuating lever 20; but when the sublevers 33 and 34 are disconnected they no longer operate in unison or combine to form the unitary composite lever 28, with the result that any operation of the hydraulic jack 16 merely causes the inner sublever 33 to oscillate idly about its pivot 29' while the outer sublever 34 and reaction rod 31 become totally inactive and ineffective.

In order to establish an operative connection between the inner sublever 33 and the outer sublever 34 to thereby produce the unitary composite lever 28 and for the consequent oscillation of the sublevers 33 and 34 in unison on the bolt or pivot 29', a stub shaft 42 is mounted for rotation in the aligned, transversely of the sublever 33, bearings 42' and disposed in apertures in the arms 39 thereof adjacent to the connection between the piston rod 18 and the ears 40. The stub shaft 42 is mounted to rotate through 180° and this rotation is accomplished through a sprocket gear 43 which is mounted on the shaft 42 adjoining one of the arms 39 of the said lever and is staked to the shaft 42 by the pin 44 piercing both the hub of the gear 43 and the shaft 42. A A collar 45 surrounds the stub shaft 42 throughout its length and is recessed at one end portion to underlie and directly mount the hub of the sprocket 43 and thereby provide a shoulder 46 which abuts the inner end of the hub of the sprocket 43 (see Figs. 5 and 6). That part 47 of the collar 45 extending beyond the sprocket 43 is appreciably thicker than the recessed end portion thereof and fills the space that would otherwise be vacant between the inner end of the hub of the sprocket 43 and the arm 39 opposed to the companion arm 39 adjoining the sprocket, thereby aiding in maintaining the sprocket in position. The pin or stake 44 pierces not only the hub of the sprocket 43 but also the shaft 42 and the surrounding collar 45 so that these elements for all practical purposes become one and can rotate as a unit relative to the bearings 42' provided for the shaft 42 in the arms 39 of the inner sublever 33.

On the inner face of each arm 35 of the outer sublever 34 is provided a semi-circular boss 49 that may be formed integrally with or attached to the arm to become a fixed or integral part thereof. The semi-circular boss 49 on one arm 35 of the outer sublever 34 is approximately complemental to the similar element on the inner surface of the opposite arm 35. Thus the ends of the boss 49 on one arm 35 of the outer sublever 34 are substantially aligned transversely of that lever with the ends of the companion boss on the other arm 35 and these bosses curve in opposite directions away from a common plane approximately traversing the inner ends of both bosses. By this means partial or open sockets are provided on the inner surfaces of the arms 35 of the outer sublever 34 by the bosses 49, one socket being open toward the web 36 and the other being open toward the bracket 29 and the pivot pin or bolt 29' carried thereby.

For cooperation with these open sockets a locking extension or bolt 50 is provided at each end of the shaft 42, the extension 50 at one end of the shaft being displaced approximately 180° from the extension 50 at the other end of the shaft. The locking extensions 50, being disposed on opposite sides of and therefore eccentric to the axis of the shaft 42 will, as the shaft is rotated through 180°, be seated in or removed from the sockets defined by the bosses 49 when the shaft 42 is aligned therewith transversely of the composite lever 28.

Figures 1, 2:
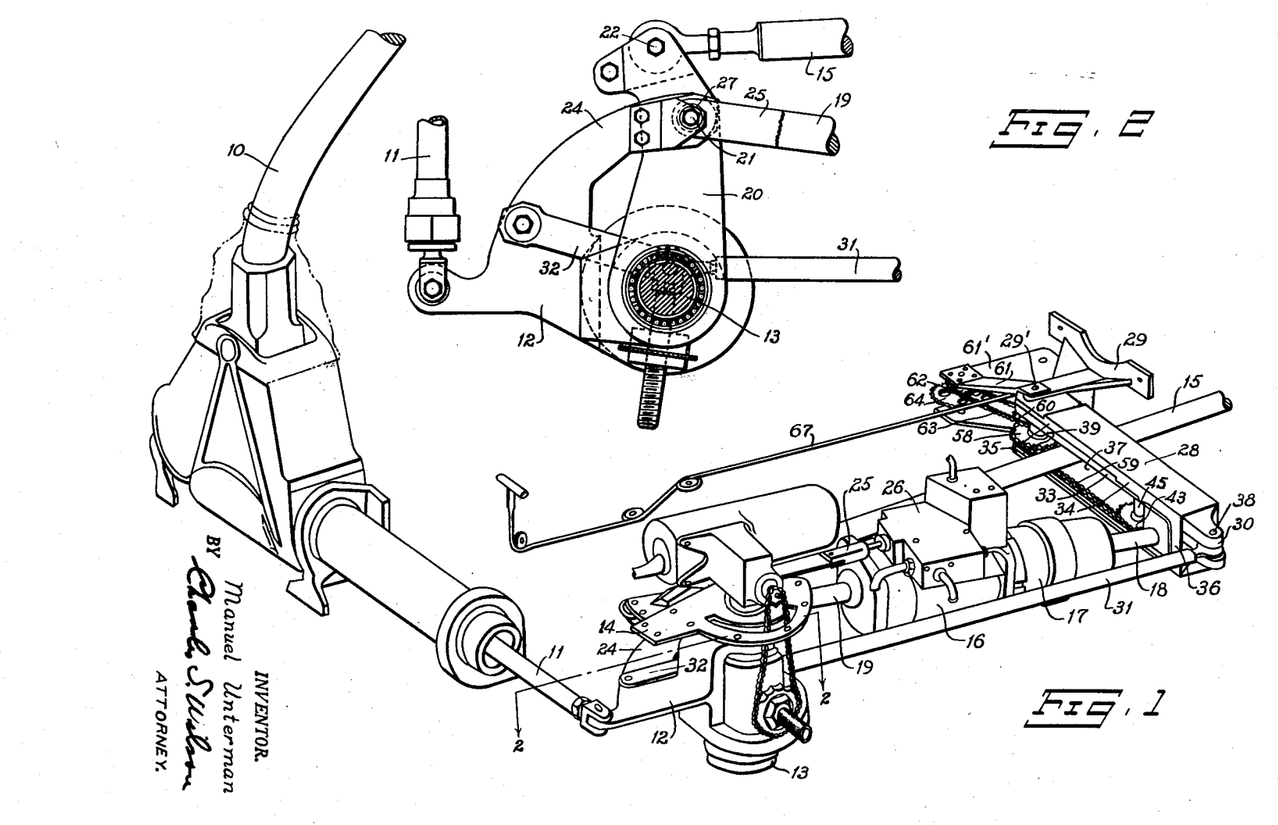
Fig. 1 is a perspective view of an aircraft control system equipped with one type of power unit or mechanism and the present release or disconnect.
Fig. 2 is a section taken generally along line 2—2 of Fig. 1 to show the connections by which the control surfaces may be operated either directly by and from the control lever or stick, or in the alternative by the power unit or mechanism under the regulation and control of the control lever or stick.
Figures 3, 4:
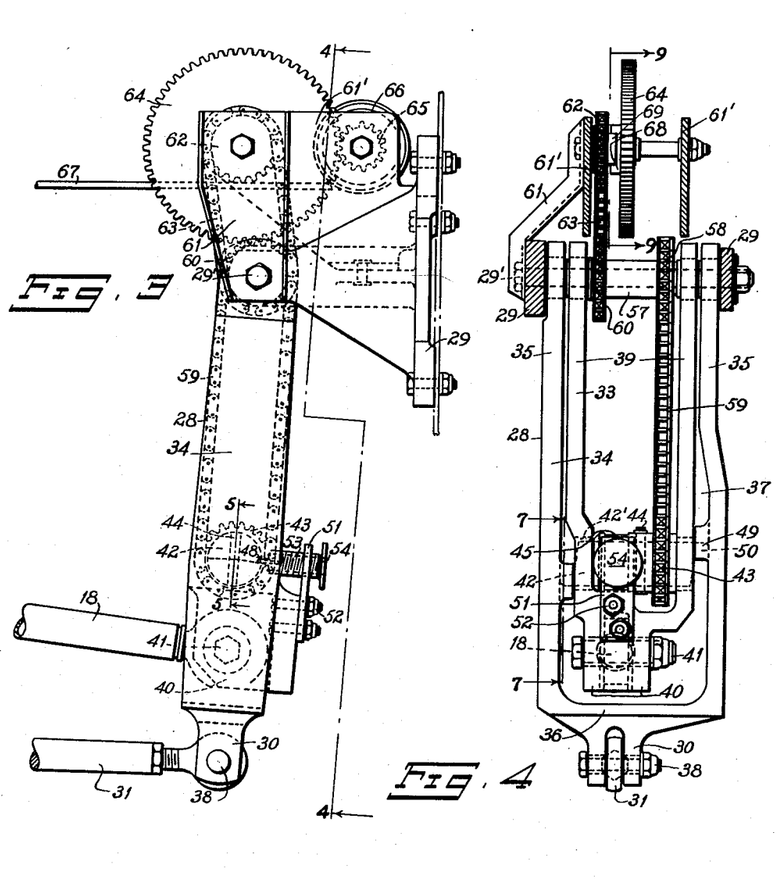
Fig. 3 is an elevation of a part of the control system and illustrates the subject release or disconnect associated therewith.
Fig. 4 is a section taken along line 4—4 of Fig. 3.
Figure 5:
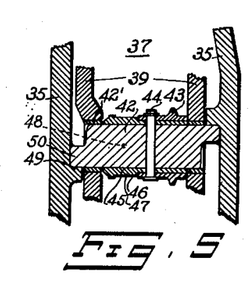
Fig. 5 is a section taken along the line 5—5 of Fig. 3 to illustrate the device by which the release or disconnection of the power unit from the control system is accomplished, and discloses the components thereof in cooperative or locked interengagement.
Figure 6:
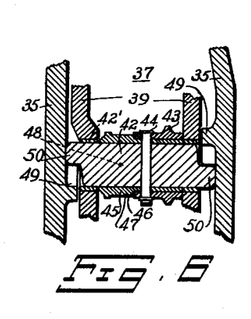
Fig. 6 is a similar section illustrating the components in their released or disengaged positions for ultimate removal or disconnection of the power mechanism or unit from the control system.
Figure 7:
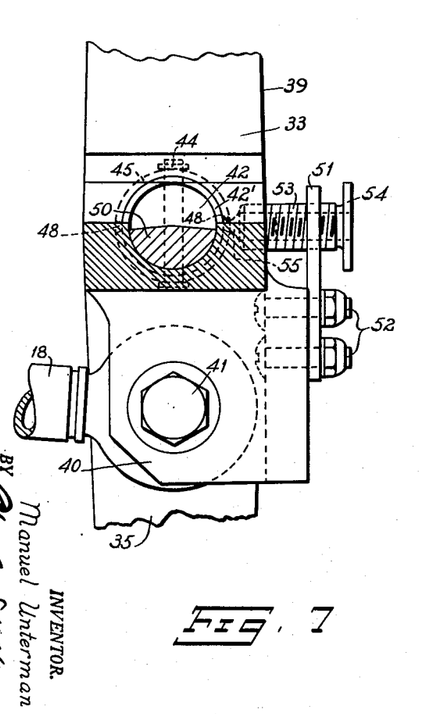
Fig. 7 is a section taken along line 7—7 of Fig. 4 to disclose the components of the disconnect as seen at right angles to Fig. 5.
Figure 8:
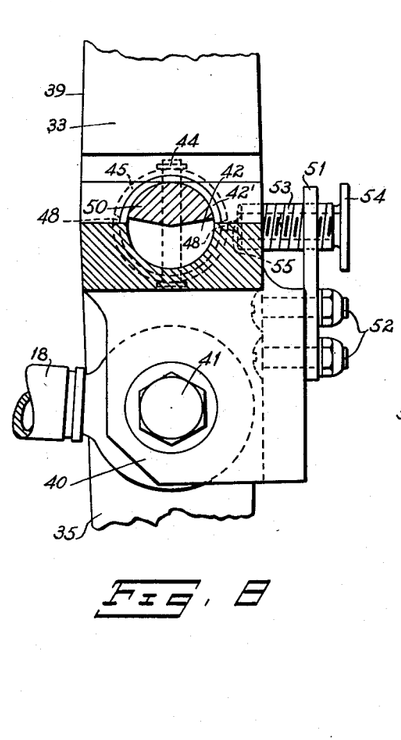
Fig. 8 is a similar section illustrating the components of the disconnect as seen at right angles from Fig. 6.

When the extensions 50 of the shaft 42 are seated in the open sockets defined by the substantially semi-circular bosses 49, as shown in Fig. 5, the sublevers 33 and 34 are locked together to establish the unitary composite lever 28. If and when the shaft 42 is rotated through 180° to the position shown in Fig. 6, the extensions 50 thereof are rotated out of the coacting sockets defined by the bosses 49 to free or release the inner sublever 33 from attachment to the outer sublever 34 whereby the former may swing about its pivot 29' independently of and without affecting the latter.

To prevent any rotation of the shaft 42 during the oscillation of the composite lever 28 about its pivot 29' or to prevent any rotation thereof during the independent oscillation of the inner sublever 33 about the pivot or pin 29', the portion 47 of the collar 45 is impressed with two diametrically opposed depressions 48. A rigid plate 51 is secured to the end of the inner sublever 33 adjoining the ears 39 in approximate alignment with a point medially of the length of the portion 47 of the collar 45 by the bolts or other suitable attaching means 52. This plate 51 at its free end and in alignment with the plane of the depressions 48 in the portion 47 of the collar 45 is pierced by an internally threaded aperture in which an externally threaded hollow sleeve 53 is mounted. The outer end of the sleeve 53 is provided with a flanged head 54 for use in manually rotating and adjusting the sleeve relative to the plate 51. An inner sleeve 53' having its inner end closed by an end wall 53'' is tightly fitted into the sleeve 53 and a detent 55 is mounted for reciprocation therein, being held against outward projection by a lip 54' bent inwardly from the wall of the inner sleeve 53' to overlie the base of the detent 55. The detent 55 is projected outwardly of the sleeves 53 and 53' in the direction of the portion 47 of the collar 45 by a spring 56 disposed within the sleeve between the base of the detent and the end wall 53'' of the inner sleeve 53'. When, in the rotation of the shaft 42 and collar 45, one or the other of the depressions 48 aligns with the detent 55 the latter will enter the depression 48 so aligned and tend to hold the shaft 42, collar 45 and sprocket 43 against rotary movement. However, if power is applied to the sprocket 43, as will be described, the action of the spring 56 will be overcome by the detent 55 being forced to retract into the sleeve 53', so that the whole assembly, consisting of the collar 45 and the shaft 42, may be rotated by the sprocket 43.

For the purpose of rotating the sprocket 43 and by it the stub shaft 42 and collar 45, a cylinder 57 is loosely mounted between the arms 39 of the inner sublever 33 on the pivot pin or bolt 29' carried by the bracket 29. At one of its ends this cylinder has a sprocket 58 keyed or otherwise fixed thereto in alignment with the sprocket 43 longitudinally of the inner sublever 33. A sprocket chain 59 operates over both sprockets 43 and 58 whereby the rotation of the cylinder 57 in rotating the sprocket 58 will, through the chain 59, turn the sprocket 43 and with it the shaft 42 and collar 45. The cylinder 57 is rotated by a driving sprocket 60 keyed or otherwise secured to the opposite end of the cylinder to the sprocket 58. The power required to rotate the cylinder 57, the sprocket 58, the sprocket 43, the shaft 42 and collar 45 is applied to the driving sprocket 60 by the pilot through a driving mechanism.

An auxiliary bracket 61 is mounted on the main bracket 29 adjacent to and in alignment with one end of the pivot pin or bolt 29' and extends outwardly and inwardly over the adjoining end of the latter. At its upper end this bracket supports a pair of spaced parallel plates 61' between which is supported the mechanism by which the driving sprocket 60 is operated. This mechanism consists of a power sprocket 62 aligned with the driving sprocket 60 and connected thereto by a chain 63 so that the rotation of the power sprocket 62 will rotate the driving sprocket 60 and the cylinder 57 together with the sprocket 58. Connected to the sprocket 62 by the lost motion coupling shown in Fig. 9 and to be hereinafter described, is the relatively large gear 64 of a gear reduction. This gear 64 meshes with and is driven by the small gear 65 of the gear reduction which in turn is attached to a drum 66. A cable 67 extends to a convenient point in the cockpit at one of its ends and is attached to and partly encircles the drum 66 at the other of its ends. If the pilot exerts a pull upon the cable 67 it, being eccentrically attached to the drum 66, will cause the latter to rotate and in so doing, rotate the gear 65. This rotation of the gear 65 by causing the rotation of the gear 64 sets up the chain of operation above described through the sprockets 62, 60, 58 and 43 to turn the shaft 42 as aforesaid. The ratio of the gears 64 and 65 is such that the rotation of the gear 65 results in the rotation of the stub shaft 42 through 180° only.

Since the present disconnect or release as shown is only operative to break the connection between the inner sublever 33 and the outer sublever 34 by the rotation of the stub shaft 42 to remove the extensions 50 thereof from the sockets defined by the bosses 49, it is evident that it is necessary to rotate the drum 66 in one direction only. Therefore, once the pilot has operated the disconnect to release the inner sublever 33 from the outer sublever 34, no means is available to him in the present disclosure to reestablish the connection between said sublevers: this can only be done on the ground after landing. However, means can readily be incorporated in or associated with the present disclosure to permit the pilot to operate the mechanism in reverse to reestablish the connection between the sublevers without departing from the spirit and scope of this invention or the basic principles thereof.

Figure 9:
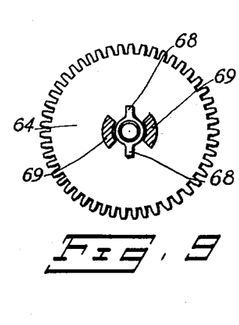
Fig. 9 is a section along line 9—9 of Fig. 4 to illustrate the details of the lost motion connection which eliminates any accidental operation of the present release or disconnect.
Figure 10:
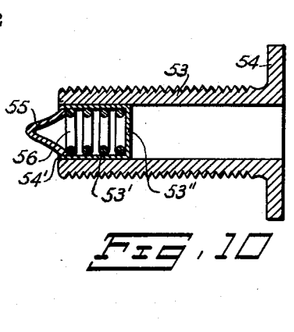
Fig. 10 is a longitudinal section through the locking detent and associated parts, shown in elevation in Figs. 7 and 8 which also prevents accidental operation of the release.

To prevent any rotation of the sprocket 62, or of the gears 64 and 65 during operative oscillation of the composite lever 28, or at least prevent any rotation thereof that might cause the stub shaft 42 to turn unintentionally, a lost motion coupling is provided between the gear 64 and power sprocket 62 such as that shown in Fig. 9. This coupling consists of a stud or finger 68 fixed to and extending on both sides of the end of the axle of the power sprocket 62 and a pair of spaced ears 69 fixed to the gear 64 and concentric to the common axis of rotation of both said gear and sprocket.

The ends of the studs or fingers 68 are positioned between the ears 69 and are free to oscillate in the spaces between the said ears until contact is made between the studs or fingers and the ears whereupon the gear 64 and the power sprocket will move in unison. This lost motion coupling permits a limited oscillation or rotation of either the power sprocket 62 or the gear 64 without operative connection with the other of these two elements. In short there is a delay between the initiation of rotary movement of either the sprocket 62 or the gear 64 and the ultimate turning of the sprocket and gear together, the duration of which is determined by the relative positions of the studs or fingers 68 and ears 69 at the time movement of one or the other and its associated part is commenced.

The operation and utility of the subject disconnect or release has been made abundantly clear in connection with the foregoing detailed description of the construction of the release or disconnect. It is manifest that so long as the operation of the motor 16 in functioning as a part of the control system and to adjust the actuating lever 20 and push-pull rod 15 is dependent on the composite lever 28, the latter must either be fixed against movement or have only a limited swinging movement. The sole purpose of the swinging movement of the composite lever 28 is to transmit a reflection of the power developed by the motor 16 to the control stick or lever 10 through the rod 31, bellcrank 12 and link 11 and but for that end the piston rod 18 of the motor could be directly connected to a fixed part of the structure and thereby direct all of the power developed by the motor to the actuating lever 20. The composite lever 28 therefore serves the dual purpose first of transmitting part of the load developed by the motor 16 to the reaction rod 31 and second, of "bucking-up" or resisting the operation of the motor to deliver the remainder of the load developed by the motor to the actuating lever 20. If the composite lever 28 is rendered ineffective or inoperative to "buck-up" or resist the operation of the motor 16, the motor becomes wholly ineffective to either oscillate the actuating lever 20 or reciprocate the reaction rod 31. This, the present invention accomplishes, leaving the operation or adjustment of the movable control surfaces to the control lever or stick 10, link 11, bellcrank lever 12, actuating lever 20 and the push-pull rod 15 without the intervention of the remaining elements of the system such as the motor 16, cylinder rod 19, piston rod 18, composite lever 28 and its components, reaction rod 31, link 24, etc.

What is claimed is:

1. The combination with a composite lever composed of a pair of sub-levers mounted to oscillate, either in unison or independently, on a common pivot, of a releasable connection between said sub-levers consisting of an open socket secured to one sub-lever, a rotary stub shaft carried by the other sub-lever in approximate transverse alignment with said socket, a bolt eccentrically and coextensively carried by and fixed to the end of said stub shaft to be seated in or removed from said socket upon the rotation of the stub shaft, said bolt when seated in the socket attaching the sub-levers one to the other to establish the composite lever for the oscillation of said sub-levers in unison and when freed of said socket permitting the independent oscillation of said sub-levers, and means associated with said composite lever for the rotation of said stub shaft as aforesaid.

2. The combination with a composite lever composed of a pair of sub-levers mounted to oscillate, either in unison or independently, on a common pivot, of a releasable connection between said sub-levers consisting of an open socket secured to one sub-lever, a rotary stub shaft carried by the other sub-lever in approximate transverse alignment with said socket, a bolt carried by and eccentrically projecting from the end of said stub shaft to be seated in or removed from said socket upon the rotation of the stub shaft, said bolt when seated in the socket attaching the sub-levers one to the other to establish the composite lever for the oscillation of said sub-levers in unison and when freed of said socket permitting the independent oscillation of said sub-levers, means associated with the sub-lever carrying the stub shaft to rotate the latter through at least 180° to seat the bolt thereof in or remove it from the seat aforesaid, and means for preventing the rotation of the stub shaft by and from the oscillation of the sub-lever carrying it.

3. The combination with a pair of levers mounted at corresponding ends for oscillation on a common pivot, of a bolt mounted for eccentric rotation on and projecting laterally from one of said levers, a socket on the other of said levers organized and arranged to receive said bolt upon its rotation to unite said levers for oscillation in unison and to release said bolt upon its continued rotation or upon the reversal of its direction of rotation, and means associated with the pivot aforesaid for rotating said bolt.

4. The combination with a pair of substantially parallel levers, of a common pivot for pivotally supporting corresponding ends of said levers, a rotary stub shaft carried by one of said levers, an outstanding bolt eccentrically secured to and projecting from an end of said stub shaft, an outstanding, substantially semi-circular, boss fixed to the other lever to define a socket in alignment with approximately one-half of said stub shaft and normally having said bolt seated therein to connect said levers for pivotal movement in unison on said common pivot, and means for rotating the stub shaft to remove the bolt from said socket and thereby sever the connection between said levers to permit their independent pivotal movement on said common pivot.

5. The combination with a pair of parallel levers, mounted to swing either in unison or independently on a common pivot, of a transverse stub shaft mounted for rotation on one of said levers, a bolt forming an eccentric continuation of each end of said shaft, bosses affixed to the other of said levers defining sockets for the reception of said bolts, and means for rotating said shaft to remove the bolts from said sockets.

6. The combination with a pair of parallel levers mounted to swing either in unison or independently on a common pivot, a stub shaft transversely mounted for rotation on one lever, a bolt at one end of said shaft and projecting toward the other lever, a semi-circular socket on said other lever to normally receive the bolt and thereby unite said levers to swing in unison on said pivot, and means for imparting a partial rotation to said stub shaft to remove the bolt from said socket to free said levers for independent swinging movement relative to said pivot.

7. The combination with a pair of parallel levers mounted to swing, in unison or independently, on a common pivot, of a stub shaft transversely mounted for rotation on one lever, a bolt eccentrically and coextensively disposed on at least one end of said shaft and projecting toward the other lever, a semi-circular socket on said other lever to normally receive the bolt and thereby unite said levers to swing in unison on said common pivot, means associated with the common pivot of said levers to rotate said stub shaft through approximately 180° to remove the bolt from said socket and thereby release said levers for independent swinging movement relative to said common pivot, and means for preventing the rotation of said stub shaft by and during the oscillation of either or both of said levers.

8. The combination with a pair of generally parallel levers mounted to swing, independently or in unison, on a common pivot, of a transverse stub shaft mounted for rotation on one of said levers, a belt eccentrically secured to one end of said stub shaft, an approximately semi-circular socket carried by the other lever to receive said bolt and unite said levers for movement in unison on said common pivot, driven means affixed to the stub shaft for the rotation thereof, and driving means associated with the common pivot of said levers and arranged to rotate said driven means through approximately 180° to remove said bolt from the socket aforesaid for the independent movement of said levers relative to said common pivot.

9. The combination with a pair of substantially parallel levers mounted to swing independently or in unison on a common pivot, of a transverse stub shaft mounted for rotation on one of said levers, a bolt eccentrically secured to one end of said stub shaft, an approximately semi-circular socket carried by the other lever to receive said bolt and normally unite said levers for movement in unison on said common pivot, a driven sprocket fixed to the stub shaft for the rotation thereof to remove the bolt from coaction with said socket and thereby permit independent movement of said levers relative to said common pivot, a driving sprocket mounted on said common pivot in alignment with said driven sprocket, a chain operating over said sprockets for the rotation of the driven sprocket and stub shaft by the rotation of the driving sprocket, and means for rotating the driving sprocket to rotate the stub shaft and thereby remove the bolt from the socket as aforesaid.

10. The combination with a pair of generally parallel levers mounted to swing, independently or in unison, on a common pivot, of a transverse stub shaft mounted for rotation on one of said levers, a bolt eccentrically secured to one end of said stub shaft, and approximately semi-circular socket carried by the other lever to receive said bolt and normally unite said levers for movement in unison on said common pivot, a driven sprocket fixed to the stub shaft for the rotation thereof to remove the bolt from coaction with said socket and thereby permit the independent movement of said levers relative to said common pivot, a driving sprocket mounted on said common pivot in alignment with said driven sprocket, a chain operating over said sprockets for the rotation of the driven sprocket and stub shaft by the rotation of the driving sprocket, means for operating the driving sprocket to rotate the stub shaft through said chain and driven sprocket and thereby remove the bolt from the socket as aforesaid, and means associated with the stub shaft to limit its rotation to the sprockets and chain aforesaid.

11. The combination with a pair of generally parallel levers mounted to swing, independently or in unison, on a common pivot, of a transverse stub shaft mounted for rotation on one of said levers, a bolt eccentrically secured to one end of said stub shaft, an approximately semi-circular socket carried by the other lever to receive said bolt and normally unite said levers for movement in unison on said common pivot, a driven sprocket fixed to the stub shaft for the rotation thereof to remove the bolt from coaction with said socket and thereby permit independent movement of said levers relative to said common pivot, a driving sprocket mounted on said common pivot in alignment with said driven sprocket, a chain operating over said sprockets for the rotation of the driven sprocket and stub shaft by the rotation of the driving sprocket, a drum, a gear reduction between the drum and the driving sprocket, and a cable eccentrically attached to and wound on the drum to rotate the drum and thereby operate the gear reduction and driving sprocket as it unwinds from the drum.

12. The combination with a pivot rod, of a pair of substantially parallel, adjacent levers mounted for movement, independently or in unison, on said pivot rod, a transverse stub shaft mounted for rotation on one of said levers, a bolt eccentrically attached to and projecting from one end of said stub shaft, a substantially semi-circular socket carried by the other of said levers to receive and release the bolt aforesaid upon oscillation or rotation of said stub shaft, a cylinder loosely mounted on said pivot rod, a driving connection between said cylinder and stub shaft, and a drive for rotating said cylinder.

13. The combination with a pivot pin, of a pair of substantially parallel, adjacent levers mounted for movement, independently or in unison, on said pivot pin, a transverse stub shaft mounted for rotation on one of said levers, a bolt eccentrically attached to and projecting from one end of said stub shaft, a substantially semi-circular socket carried by the other of said levers to receive and release the bolt aforesaid upon oscillation or rotation of said stub shaft, a driving member loosely mounted on said pivot pin, a driving connection between said driving member and said stub shaft, and means for operating said driving member.

14. The combination with a pivot rod, of a pair of substantially parallel adjacent levers mounted for movement, independently or in unison, on said pivot rod, a transverse stub shaft mounted for rotation on one of said levers, a bolt eccentrically attached to and projecting from one end of said stub shaft, a partial socket carried by the other of said levers and disposed eccentrically of the axis of the stub shaft to receive and release the bolt aforesaid upon the oscillation or rotation of said stub shaft, a cylinder loosely mounted on said pivot rod, a driving connection between said cylinder and stub shaft, a countershaft disposed parallel to the pivot rod, a driving mechanism mounted on the countershaft, a gear reduction operatively associated with said driving mechanism, a driving connection between said cylinder and said gear reduction, including means to permit a limited movement of either independently of the other, and means to arrest rotary movement of the stub shaft independently of the driving connection between the stub shaft and the cylinder aforesaid.

15. The combination with a pivot rod, of a pair of substantially parallel adjacent levers mounted for movement, independently or in unison, on said pivot rod, a transverse stub shaft mounted for rotation on one of said levers, a bolt eccentrically attached to and projecting from one end of said stub shaft, a partial socket carried by the other of said levers and disposed eccentrically of the axis of the stub shaft to receive and release the bolt aforesaid upon the oscillation or rotation of said stub, a cylinder loosely mounted on said pivot rod, a driving connection between said cylinder and stub shaft, a countershaft disposed parallel to the pivot rod, a driving mechanism mounted on the countershaft, a gear reduction operatively associated with said driving mechanism, and a driving connection between said gear reduction and said cylinder organized and arranged to permit the temporary operation of one independently of the other.

16. The combination with a power source, a power rod to be reciprocated thereby, and a reciprocable reaction rod, of a lever pivotally supported at one of its ends and connected adjacent its opposite end to said reaction rod, and a disengageable connection between said lever and said power rod.

17. The combination with a reciprocable power rod and a reciprocable reaction rod, of a lever pivotally supported at one of its ends in association with said rods, an operative connection between the opposite end of said lever and said reaction rod, and a disengageable connection between said lever and said power rod.

18. The combination with a reciprocable power rod and an associated reaction rod, of a lever disposed across the ends of said rods and pivotally supported at one of its ends, a pivotal connection between the other end of said lever and the end of the reaction rod, and a disengageable pivotal connection between the lever medially of its ends and the end of the power rod.

19. The combination with a reciprocable power rod and an associated reciprocable reaction rod, of a composite lever disposed adjacent the corresponding ends of said rods and pivotally supported at one of its ends, a pivotal connection between a component of said lever and said reaction rod, a pivotal connection between another component of said lever and the power rod, and disengageable means for securing said components one to the other.

20. The combination with a reciprocable power rod and a reciprocable reaction rod associated therewith, of a composite lever consisting of two sub-levers mounted to swing either independently or in unison adjacent corresponding ends of said rods, a pivotal connection between one of said sub-levers and said reaction rod, a pivotal connection between the other of said sub-levers and the power rod, and means for releasably securing said sub-levers one to the other for swinging operation in unison.

21. The combination with a reciprocable power rod and a reciprocable reaction rod associated therewith, of a composite lever consisting of two substantially parallel sub-levers mounted at corresponding ends thereof for swinging movement, either independently or in unison, on a common pivot, a pivotal connection between one of said sub-levers and said reaction rod, a pivotal connection between the other sub-lever and said power rod, and means carried by one of said sub-levers to releasably engage the other sub-lever to unite them into a single composite lever.

22. The combination with a reciprocable power rod and a reciprocable reaction rod associated therewith, of a composite lever consisting of two substantially parallel sub-levers mounted at corresponding ends thereof for swinging movement, either independently or in unison, on a common pivot, a pivotal connection between one of said sub-levers and said reaction rod, a pivotal connection between the other sub-lever and said power rod, a bolt mounted on the sub-lever connected to the power rod, means on the sub-lever connected to the reaction rod to engage said bolt and thereby secure said sub-levers one to the other and establish a unitary composite lever operatively connected to both aforesaid rods, and means for operating said bolt to disengage the sub-lever connected to the reaction rod and thereby release said sub-levers for independent swinging movement relative to their common pivot.

23. The combination with a pivot pin, of an outer sub-lever consisting of a pair of substantially parallel arms pivotally supported at corresponding ends on said pivot pin and rigidly connected one to the other at the opposite ends thereof, an inner sub-lever consisting of a pair of arms resting adjacent and approximately parallel to the arms of the outer sub-lever and pivoted to said pivot pin at corresponding ends thereof and rigidly connected one to the other at the opposite ends thereof, means for attaching a rod to the outer sub-lever at the end thereof remote from the pivot pin, means for attaching a power source to the inner sub-lever adjacent the end thereof remote from the pivot pin, and means carried by the inner sub-lever to engage the arms of the outer sub-lever and thereby releasably unite said sub-levers for operation in unison on the pivot pin aforesaid.

24. The combination with a pivot pin, of an outer sub-lever consisting of a pair of substantially parallel arms pivotally supported at corresponding ends on said pivot pin and rigidly connected one to the other at the opposite ends thereof, an inner sub-lever disposed between the arms of the outer sub-lever and consisting of a pair of arms each resting adjacent and approximately parallel to one of the arms of the outer sub-lever, and the arms of said inner sub-lever being pivotally supported at corresponding ends on said pivot pin with the opposite ends thereof rigidly fixed one to the other, means for attaching a rod to the outer sub-lever at the end thereof remote from the pivot pin, means for attaching a power source to the inner sub-lever adjacent the end thereof remote from the pivot pin, a bolt eccentrically mounted on the inner sub-lever for rotation adjacent the connection between the power source and the inner sub-lever and projecting beyond the limits of the inner sub-lever to terminate adjacent the arms of the outer sub-lever, complemental sockets carried by the arms of the outer sub-lever upon opposite sides of the axis of rotation of said bolt for the reception of the ends of the bolt to thereby unite said sub-levers for operation in unison on the pivot pin, and means associated with the pivot pin for the rotation of said bolt to simultaneously remove its end portions from both of the sockets aforesaid.

25. The combination with a reciprocable power rod and a reciprocable reaction rod, of a fixed pivot pin disposed adjoining corresponding ends of said rods, an outer sub-lever comprising a pair of spaced parallel arms rigidly joined at corresponding ends and pivotally supported on the pivot pin at their opposite ends, a pivotal connection between the joined ends of the arms of the outer sub-lever and said reaction rod, an inner sub-lever disposed between the arms of the outer sub-lever comprising a pair of spaced arms each adjacent and substantially parallel to one of the arms of the outer sub-lever, said arms being rigidly joined at corresponding ends and pivotally supported on the pivot pin at their opposite ends, a pivotal connection between the joined ends of the inner sub-lever and said power arm, a stub shaft mounted for rotation on the arms of the inner sub-lever, a bolt eccentrically carried by and projecting from each end of the stub-shaft, an approximately semi-circular socket on each arm of the outer sub-lever, the socket of one arm being substantially complemental to the socket of the other arm and said sockets being organized and arranged to normally receive said bolts and thereby unite said sub-levers into a unitary composite lever, a driven sprocket attached to the stub shaft between the arms of the inner lever, a driving sprocket loosely mounted on the pivot pin between the arms of the inner sub-lever and in alignment with the driven sprocket, a sprocket chain operating over both the driven and driving sprockets, and a driving mechanism associated with the driving sprocket to operate the driving and driven sprockets and thereby rotate the stub-shaft through about 180° to remove the bolts from the sockets and disconnect said sub-levers.

References Cited in the file of this patent

UNITED STATES PATENTS

| Number | Name | Date |
|---|---|---|
| 447,607 | Gleason | Mar. 3, 1891 |
| 508,671 | Bates | Nov. 14, 1893 |
| 974,480 | Foster | Nov. 1, 1910 |
| 1,505,672 | Smith | Aug. 19, 1924 |
| 1,754,181 | Saccaggio | Apr. 8, 1930 |
| 2,167,421 | Jann | July 25, 1939 |
| 2,237,719 | Tiebel | Apr. 8, 1941 |
| 2,251,952 | Price | Aug. 12, 1941 |
| 2,503,498 | Levy | Apr. 11, 1950 |

FOREIGN PATENTS

| Number | Country | Date |
|---|---|---|
| 639,977 | France | Mar. 19, 1928 |